US008006252B2

(12) United States Patent
Pope et al.

(10) Patent No.: US 8,006,252 B2
(45) Date of Patent: Aug. 23, 2011

(54) DATA PROCESSING SYSTEM WITH INTERCEPTING INSTRUCTIONS

(75) Inventors: Steven Leslie Pope, Cambridge (GB); David James Riddoch, Cambridge (GB); Greg Law, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 955 days.

(21) Appl. No.: 11/982,110

(22) Filed: Oct. 31, 2007

(65) Prior Publication Data
US 2008/0065839 A1 Mar. 13, 2008

(30) Foreign Application Priority Data

Mar. 15, 2005 (GB) .................................. 0505297.2

(51) Int. Cl.
*G06F 3/00* (2006.01)
(52) U.S. Cl. ....................................... 719/328; 719/330
(58) Field of Classification Search .................. 719/328, 719/330
See application file for complete search history.

(56) References Cited

U.S. PATENT DOCUMENTS

| 5,448,739 | A | * | 9/1995 | Jacobson ........................ 719/320 |
| 5,535,416 | A | | 7/1996 | Feeney et al. |
| 5,680,586 | A | * | 10/1997 | Elkins et al. ..................... 703/27 |
| 6,170,018 | B1 | * | 1/2001 | Voll et al. ....................... 719/330 |
| 6,424,621 | B1 | | 7/2002 | Ramaswamy et al. |
| 6,484,224 | B1 | | 11/2002 | Robins et al. |
| 6,560,613 | B1 | | 5/2003 | Gylfason et al. |
| 6,687,762 | B1 | | 2/2004 | Van Gaasbeck et al. |
| 6,785,888 | B1 | | 8/2004 | McKenney et al. |
| 2003/0182465 | A1 | | 9/2003 | Moir et al. |
| 2004/0210906 | A1 | | 10/2004 | Beresnevichiene et al. |

FOREIGN PATENT DOCUMENTS

EP 0 598 510 5/1994

OTHER PUBLICATIONS

Yasuhiko Yokote, The Apertos Reflective Operating system: The Concept and Its implementation, 1992.*
Marc E. Fiuczynski, et al. "Spine Reports, Talks, Papers", cs.princeton.edu/~mef/research/spine/reports/sigops98/index.html, May 19, 2006, 10 pages.
Hermann Hellwagner, Josef Weidendorfer, "SCI Sockets Library", itec.uni-klu.ac.at/, bodes.in.tum.de/, 20 pages.

(Continued)

*Primary Examiner* — Lechi Truong
(74) *Attorney, Agent, or Firm* — Weide & Miller, Ltd.

(57) ABSTRACT

A data processing system with intercepting instructions comprising an operating system for supporting processes, such that the process are associated with one or more resources and the operating system being arranged to police the accessing by processes of resources so as to inhibit a process from accessing resources with which it is not associated. Part of this system is an interface for interfacing between each process and the operating system and a memory for storing state information for at least one process. The interface may be arranged to analyze instructions from the processes to the operating system, and upon detecting an instruction to re-initialize a process cause state information corresponding to that pre-existing state information to be stored in the memory as state information for the re-initialized process and to be associated with the resource.

13 Claims, 5 Drawing Sheets

OTHER PUBLICATIONS

Kevin Fall, et al., "Improving Continuous-Media Playback Performance with In-Kernel Data Paths", 0-8186-5530-5/94, © 1994 IEEE, pp. 100-109.

Maged M. Michael, et al., "Relative Performance of Preemption-Safe Locking and Non-Blocking Synchronization on Multiprogramm3ed Shared Memory Multiprocessors", 1063-7133/97, © 1997 IEEE, pp. 267-273.

Maged M. Michael, "Hazard Pointers: Safe Memory Reclamation for Lock-Free Objects", IEEE Transactions on Parallel and Distributed Systems, vol. 15, No. 6, Jun. 2004, pp. 491-504.

"HP-UX Route Administration Manager (ramD)" © 2003 Hewlett-Packard Development Company L.P., 11 pages.

Tom Zanussi, et al., "relayfs: An Efficient Unified Approach for Transmitting Data from Kernel to User Space", Linux Symposium 2003, pp. 519-532.

Cramming more components onto integrated circuits, Electronics, vol. 38, No. 8, pp. 114-117, 1965, Gordon E. Moore, Apr. 19, 1965.

Programming Semantics for Multiprogrammed Computations, Communications of the ACM, vol. 9, No. 3, pp. 143-155, Jack B. Dennis and Earl C. Van Horn, Mar. 1966.

The Aloha System, ACM Computer Communication Review, vol. 4 No. 1, F.F. Kuo, Jan. 1974.

A Protocol for Packet Network Intercommunication, IEEE Transactions on Communications, vol. COM-22, No. 5, pp. 637-648, Vinton Cerf, Robert Kahn, May 1974.

Proposal for an International End-to-End Protocol, ACM Computer Communication Review, vol. 6 No. 1, p. 1-18, V. Cerf, et al., Jan. 1976.

Ethernet: distributed packet switching for local computer networks, Communications of the ACM, vol. 19, Issue 7, pp. 395-404, Robert M. Metcalfe and David R. Boggs, Jul. 1976.

Interrupt Driven Programming, Communications of the ACM, vol. 14, No. 6, p. 417-418, Marvin Zelkowits, Jun. 1971.

Synchronizing Processors with Memory-Content-Generated Interrupts, Communications of the ACM, vol. 16, No. 6, p. 350-351, J. Carver Hill, Jun. 1973.

Virtual cut-through: A new computer communication switching technique, Computer Networks, vol. 3, No. 4, pp. 267-286, P. Kermani and L. Kleinrock, Sep. 1979.

An Overview of the New Routing Algorithm for the ARPANET, Proceedings of the 6th Data Communications Symposium, p. 63, John M. McQuillan, et al., Nov. 1979.

Grapevine: An Exercise in Distributed Computing, Communications of the ACM, vol. 25, Issue 4, pp. 260-274, Andrew D. Birrell, et al., Apr. 1982.

The Architecture of the Universe Network, ACM Computer Communication Review, vol. 14, No. 2, pp. 2-9, Ian M. Leslie, et al., Jun. 1984.

Congestion Control in IP/TCP Internetworks, ACM Computer Communication Review, vol. 14, No. 4, p. 11-17, John Nagle, Oct. 1984.

Development of a TCP/IP for the IBM/370, ACM Computer Communication Review, vol. 15, No. 4, Robert M. Brandriff, et al., Sep. 1985.

Supercomputers on the Internet: A Case Study, ACM Computer Communication Review, vol. 17, No. 5, C. Kline, Aug. 1987.

Fragmentation Considered Harmful, ACM Computer Communication Review, vol. 17, No. 5, pp. 390-401, Christopher A. Kent, Jeffrey C. Mogul, Oct. 1987.

An Analysis of Memnet: An Experiment in High-Speed Shared-Memory Local Networking, ACM Computer Communication Review, vol. 18, No. 4, p. 165-174, Gary S. Delp, et al., Aug. 1988.

Measured Capacity of an Ethernet: Myths and Reality, ACM Computer Communication Review, vol. 18, No. 4, p. 222-234, David R. Boggs, et al., Aug. 1988.

The VMP Network Adapter Board (NAB): High-Performance Network Communication for Multiprocessors, ACM Computer Communication Review, vol. 18, No. 4, p. 175-187, H. Kanakia and D. Cheriton, Aug. 1988.

Congestion Avoidance and Control, ACM Computer Communication Review, vol. 18, No. 4, p. 314-329, V. Jacobson, Aug. 1988.

The Design Philosophy of the DARPA Internet Protocols, ACM Computer Communication Review, vol. 18, No. 4, pp. 106-114, David D. Clark, Aug. 1988.

Development of the Domain Name System, ACM Computer Communication Review, vol. 18, No. 4, pp. 123-133, Paul V. Mockapetris and Kevin J. Dunlap, Aug. 1988.

Performance Comparison of the Cray-2 and Cray X-MP/416 Supercomputers, Proceedings of the 1988 ACM/IEEE conference on Supercomputing, p. 288-295, Orlando, Florida, Margaret L. Simmons and Harvey J. Wasserman, Nov. 12, 1988.

Implementing TCP/IP on a Cray computer, ACM Computer Communication Review, vol. 19, No. 2, p. 11-15, David A. Borman, Apr. 1989.

Computing the Internet Checksum, ACM Computer Communication Review, vol. 19, No. 2, p. 86-94, R. Braden, et al., Apr. 1989.

An Analysis of TCP Processing Overhead, IEEE Communications Magazine, vol. 27, No. 6, pp. 23-29, David D. Clark, et al., Jun. 1989.

Sirpent: A High-Performance Internetworking Approach, ACM Computer Communication Review, vol. 19, No. 4, p. 158-169, David R. Cheriton, Sep. 1989.

Protocol Design for High Speed Networks, PhD Thesis, University of Cambridge, Derek Robert McAuley, Sep. 1989.

How Slow Is One Gigabit Per Second?, ACM Computer Communication Review, vol. 20, No. 1, p. 44-53, Craig Partridge, Jan. 1990.

Architectural Considerations for a New Generation of Protocols, ACM Computer Communication Review, vol. 20, No. 4, pp. 200-208, D. D. Clark and D. L. Tennenhouse, Sep. 1990.

Protocol Implementation on the Nectar Communication Processor, ACM Computer Communication Review, vol. 20, No. 4, p. 135-144, Eric C. Cooper, et al., Sep. 1990.

A Host-Network Interface Architecture for ATM, ACM Computer Communication Review, vol. 21, No. 4, Bruce S. Davie, Sep. 1991.

A High-Performance Host Interface for ATM Networks, ACM Computer Communication Review, vol. 21, No. 4, p. 317-325, C. Brendan S. Traw, Sep. 1991.

Fairisle: An ATM Network for the Local Area, ACM Computer Communication Review, vol. 21, No. 4, p. 327, Ian Leslie and Derek R. McAuley, Sep. 1991.

The Desk Area Network, ACM Operating Systems Review, vol. 25, Issue 4, p. 14-21, Mark Hayter and Derek McAuley, Oct. 1991.

An Integration of Network Communication with Workstation Architecture, ACM Computer Communication Review, vol. 21, No. 5, p. 18-29, 1991.

The Evolution of XTP, Proceedings of the Third International Conference on High Speed Networking,. Greg Chesson. Nov. 1991.

System support for multi-service traffic, University of Cambridge Computer Laboratory Technical Report No. 245, Michael J. Dixon, Jan. 1992.

ATOMIC: A Local Communication Network Created Through Repeated Application of Multicomputing Components, Made available by authors, Danny Cohen, Gregory Finn, Robert Felderman, Annette DeSchon, Jan. 10, 1992.

Message Authentication with One-Way Hash Functions, ACM Computer Communication Review, vol. 22, No. 5, pp. 29-38, Gene Tsudik, Oct. 1992.

Analyzing Communication Latency using the Nectar Communication Processor, ACM Computer Communication Review, vol. 22, No. 4, Peter Steenkiste, Oct. 1992.

Efficient Demultiplexing of Incoming TCP Packets, ACM Computer Communication Review, vol. 22, No. 4, Paul E. McKenney and Ken F. Dove, Oct. 1992.

TCP/IP on the Parallel Protocol Engine, Proceedings of the IFIP TC6/WG6.4 Fourth International Conference on High Performance Networking IV, Erich Ruetsche and Matthias Kaiserswerth, Dec. 14, 1992.

Hardware/Software organization of a high performance ATM host interface, IEEE Journal on Selected Areas in Communications, pp. 240-253, C. Traw and J. Smith, Feb. 1993.

The Architecture of Gb/s Multimedia Protocol Adapter, ACM Computer Communication Review, vol. 23, No. 3, E. Ruetsche, Jul. 1993.

Giving Applications Access to Gb/s Networking, IEEE Network, vol. 7, Issue 4, pp. 44-52, Jonathan M. Smith and C. Brendan S. Traw, Jul. 1993.

The Design and Evaluation of an Off-Host Communications Protocol Architecture, MSci Thesis, University of Virginia, Jeffrey R. Michel, Aug. 1993.
A Workstation Architecture to Support Multimedia, PhD Thesis, University of Cambridge, Mark David Hayter, Sep. 1993.
The Importance of Non-Data Touching Processing Overheads in TCP/IP, ACM Computer Communication Review, vol. 23, No. 4, pp. 259-268, Jonathan Kay and Joseph Pasquale, Oct. 1993.
On the Self-Similar Nature of Ethernet Traffic, ACM Computer Communication Review, vol. 23, No. 4, p. 85-95, W. E. Leland, et al., Oct. 1993.
Implementing Network Protocols at User Level, ACM Computer Communication Review, vol. 23, No. 4, C. A. Thekkath, et al., Oct. 1993.
A Programmable HIPPI Interface for a Graphics Supercomputer, Proceedings of the 1993 ACM/IEEE conference on Supercomputing, p. 452-461, Portland, Oregon, Raj K. Singh, et al., Nov. 15, 1993.
Fbufs: A High-Bandwidth Cross-Domain Transfer Facility, ACM Operating Systems Review, vol. 27, Issue 5, p. 189-202, Peter Druschel and Larry L. Peterson, Dec. 1993.
The Parallel Protocol Engine, IEEE/ACM Transactions on Networking, vol. 1, No. 6, p. 650-663, Matthias Kaiserswerth, Dec. 1993.
Protocol Service Decomposition for High-Performance Networking, ACM Operating Systems Review, vol. 27, Issue 5, p. 244-255, Chris Maeda, Brian Bershad, Dec. 1993.
ETA: Experience with an Intel Xeon Processor as a Packet Processing Engine, IEEE Micro, vol. 24, No. 1, p. 24-31, Greg Regnier, et al., Jan. 1994.
A Simple LAN Performance Measure, ACM Computer Communication Review, vol. 24, No. 1, pp. 7-11, J. Vis, Jan. 1994.
ATOMIC: A High-Speed Local Communication Architecture, Journal of High Speed Networks, Danny Cohen, Gregory Finn, Robert Felderman, and Annette DeSchon, Jan. 3, 1994.
Netstation Architecture Multi-Gigabit Workstation Network Fabric, Proceedings of InterOp '94, Las Vegas, Nevada, Gregory G. Finn and Paul Mockapetris, May 1994.
The Medusa Applications Environment, Proceedings of the International Conference on Multimedia Computing and Systems, p. 265-273, Boston, Stuart Wray, et al., May 1994.
MPI: A Message-Passing Interface Standard, Message-Passing Interface Forum, University of Tennessee, Knoxville, Various forum members, May 5, 1994.
A Programmable Network Interface for a Message-Based Multicomputer, ACM Computer Communication Review, vol. 24, No. 3, p. 8-17, Raj K. Singh, et al., Jul. 1994.
Experiences with a High-Speed Network Adaptor: A Software Perspective, ACM Computer Communication Review, vol. 24, No. 4, P. Druschel, et al., Oct. 1994.
TCP and Explicit Congestion Notification, ACM, ACM Computer Communication Review, vol. 24, No. 5, p. 8-23, Sally Floyd, Oct. 1994.
User-Space Protocols Deliver High Performance to Applications on a Low-Cost Gb/s LAN, ACM Computer Communication Review, vol. 24, No. 4, pp. 14-23, A. Edwards, et al., Oct. 1994.
TCP Vegas: New Techniques for Congestion Detection and Avoidance, ACM Computer Communication Review, vol. 24, No. 4, p. 24-35, L. S. Brakmo, et al., Oct. 1994.
The Dynamics of TCP Traffic over ATM Networks, ACM Computer Communication Review, vol. 24, No. 4, p. 79-88, A. Romanow and S. Floyd, Oct. 1994.
Experiences of Building an ATM Switch for the Local Area, ACM Computer Communication Review, vol. 24, No. 4, p. 158-167, R. J. Black, I. Leslie, and D. McAuley, Oct. 1994.
Application-Specific Protocols for User-Level Shared Memory, Proceedings of the 1994 conference on Supercomputing, pp. 380-389, Washington D.C., Babak Falsafi, et al., Nov. 14, 1994.
Performance of High-Speed Network I/O Subsystems: Case Study of a Fibre Channel Network, Proceedings of the 1994 conference on Supercomputing, Washington D.C., Mengjou Lin, et al., Nov. 14, 1994.
Myrinet: A Gigabit-per-Second Local-Area Network, Draft of paper published in IEEE Micro, vol. 15, No. 1, pp. 29-36, Nanette J. Boden, et al., Nov. 16, 1994.

Beowolf: A Parallel Workstation for Scientific Computation, Proceedings of the 24th International Conference on Parallel Processing, pp. 11-14, Thomas Sterling, et al., Aug. 1995.
Software Support for Outboard Buffering and Checksumming, ACM Computer Communication Review, vol. 25, No. 4, p. 87-98, K. Kleinpaste, P. Steenkiste, B. Zill,, Oct. 1995.
Performance of Checksums and CRCS over Real Data, ACM Computer Communication Review, vol. 25, No. 4, p. 68-76, C. Partridge, J. Hughes, and J. Stone, Oct. 1995.
Experiences Implementing a High-Performance TCP in User-Space, ACM Computer Communication Review, vol. 25, No. 4, A. Edward and S. Muir, Oct. 1995.
The Case for Persistent-Connection HTTP, ACM Computer Communication Review, vol. 25, No. 4, J. C. Mogul, Oct. 1995.
U-Net: A User-Level Network Interface for Parallel and Distributed Computing, ACM Operating Systems Review, vol. 29, Issue 5, p. 109-126, Thorsten von Eicken, et al., Dec. 1995.
Towards an Active Network Architecture, ACM Computer Communication Review, vol. 26, No. 2, pp. 15-20, D. L. Tennenhouse, and D. J. Wetherall, Apr. 1996.
Devices in a Multi-Service Operating System, PhD Thesis, University of Cambridge, Paul Ronald Barham, Jul. 1996.
Low-Latency Communication on the IBM RISC System/6000 SP, Gigabit Networking Workshop '97 Meeting, Kobe, Japan, Chi-Chao Chang, et al., Nov. 17, 1996.
Experiences with a Production Gigabit LAN, Gigabit Networking Workshop '97 Meeting, Kobe, Japan, Joe Touch, et al., Apr. 1997.
Host-based Routing Using Peer DMA, Gigabit Networking Workshop '97 Meeting, Kobe, Japan, Joe Touch, et al., Apr. 1997.
Report on the 5th IFIP Internation Workshop on Quality of Service (IWQOS 97), ACM Computer Communication Review, vol. 27, No. 3, pp. 100-117, O. Angin, et al., Jul. 1997.
Firefly: a Multiprocessor Workstation, ACM Operating Systems Review, vol. 21, Issue 4, p. 164-172, Charles P. Thacker and Lawrence C. Stewart, Oct. 1997.
Performance of the CRAY T3E Multiprocessor, Proceedings of the 1997 ACM/IEEE conference on Supercomputing, p. 1-17, San Jose, California, Ed Anderson, et al., Nov. 16, 1997.
Performance Evaluation of the SGI Origin2000: A Memory-Centric Characterization of LANL ASCI Applications, Proceedings of the 1997 ACM/IEEE conference on Supercomputing, p. 1-11, San Jose, California, Harvey J. Wassermann, et al., Nov. 16, 1997.
An Implementation and Analysis of the Virtual Interface Architecture, Proceedings of the 1998 ACM/IEEE conference on Supercomputing, p. 1-15, Orlando, Florida, Philip Buonadonna, et al., Nov. 7, 1998.
MPI-StarT: Delivering Network Performance to Numerical Applications, Proceedings of the 1998 ACM/IEEE conference on Supercomputing, p. 1-15, Orlando, Florida, Parry Husbands and James C. Hoe, Nov. 7, 1998.
Avalon: An Alpha/Linux Cluster Achieves 10 Gflops for $150k, Proceedings of the 1998 ACM/IEEE conference on Supercomputing, Orlando, Florida, Michael S. Warren, et al., Nov. 7, 1998.
Scaling of Beowulf-class Distributed Systems, Proceedings of the 1998 ACM/IEEE conference on Supercomputing, Orlando, Florida, John Salmon, et al., Nov. 7, 1998.
StarT-Voyager: A Flexible Platform for Exploring Scalable SMP Issues, Proceedings of the 1998 ACM/IEEE conference on Supercomputing, Orlando, Florida, Boon S. Ang, et al., Nov. 7, 1998.
Enhancing Distributed Systems with Low-Latency Networking, Parallel and Distributed Computing and Networks, Brisbane, Australia, S. L. Pope, et al., Dec. 1998.
Internet Vulnerabilities Related to TCP/IP and T/TCP, ACM Computer Communication Review, vol. 29, No. 1, pp. 81-85, M. de Vivo, et al., Jan. 1999.
TCP Byte Counting Refinements, ACM Computer Communication Review, vol. 29, No. 3, M. Allman, Jul. 1999.
Piglet: A Low-Intrusion Vertical Operating System, Technical Report MS-CIS-00-04, University of Pennsylvania, Steve Muir and Jonathan Smith, Jan. 2000.

Characterizing Processor Architectures for Programmable Network Interfaces, Proceedings of the 14th international conference on Supercomputing, pp. 54-65, Santa Fe, New Mexico, Patrick Crowley, et al., May 8, 2000.

When The CRC and TCP Checksum Disagree, ACM Computer Communication Review, vol. 30, No. 4, pp. 309-319, Jonathan Stone and Craig Partridge, Oct. 2000.

The Failure of TCP in High-Performance Computational Grids, Proceedings of the 2000 ACM/IEEE conference on Supercomputing, Dallas, Texas, W. Feng and P. Tinnakornsrisuphap, Nov. 4, 2000.

Architectural and Performance Evaluation of GigaNet and Myrinet Interconnects on Clusters of Small-Scale SMP Servers, Proceedings of the 2000 ACM/IEEE conference on Supercomputing, Dallas, Texas, Jenwei Hsieh, et al., Nov. 4, 2000.

Arsenic: A User-Accessible Gigabit Ethernet Interface, Proceedings of IEEE Infocom 2001, pp. 67-76, Ian Pratt and Keir Fraser, Apr. 22, 2001.

Deferred Segmentation For Wire-Speed Transmission of Large TCP Frames over Standard GbE Networks, Proceedings of the 9th Symposium on High Performance Interconnects, pp. 81, Bilic Hrvoye, et al., Aug. 22, 2001.

Presentation given at HOTI'01, 9th Symposium on High Performance Interconnects, Bilic Hrvoye, et al., Aug. 22, 2001.

Topology Discovery for Large Ethernet Networks, ACM Computer Communication Review, vol. 31, No. 4, Bruce Lowekamp, et al., Oct. 2001.

EMP: Zero-copy OS-bypass NIC-driven Gigabit Ethernet Message Passing, Proceedings of the 2001 ACM/IEEE conference on Supercomputing, pp. 57, Denver, Piyush Shivam, et al., Nov. 10, 2001.

A Case Study in Application I/O on Linux Clusters, Proceedings of the 2001 ACM/IEEE conference on Supercomputing, pp. 11, Denver, Robert Ross, et al., Nov. 10, 2001.

On Making TCP More Robust to Packet Reordering, ACM Computer Communication Review, vol. 32, No. 1, E. Blanton and M. Allman, Jan. 2002.

TCP Servers: Offloading TCP Processing in Internet Servers. Design, Implementation, and Performance, Technical Report DCR-TR-481, Computer Science Department, Rutgers University, Murali Rangarajan, et al., Mar. 2002.

ATM: A Retrospective on Systems Legacy, ACM Computer Communication Review, vol. 32, No. 5, Jon Crowcroft and Derek McAuley, Nov. 2002.

A Retrospective View of ATM, ACM Computer Communication Review, vol. 32, No. 5, pp. 13-19, Charles Kalmanek, Nov. 2002.

The Influence of ATM on Operating Systems, ACM Computer Communication Review, vol. 32, No. 5, pp. 29-37, Jonathan Smith, Nov. 2002.

An Overview of the BlueGene/L Supercomputer, Proceedings of the 2002 ACM/IEEE conference on Supercomputing, pp. 1-22, Baltimore, NR Adiga, et al., Nov. 16, 2002.

Ultra-High Performance Communication with MPI and the Sun Fire Link Interconnect, Proceedings of the 2002 ACM/IEEE conference on Supercomputing, p. 1-15, Baltimore, Steven J. Sistare and Christopher J. Jackson, Nov. 16, 2002.

Some Internet Architectural Guidelines and Philosophy, IETF Network Working Group, Request for Comments: 3439, R. Bush, D. Meyer, Dec. 2002.

F-RTO: An Enhanced Recovery Algorithm for TCP Retransmission Timeouts, ACM Computer Communication Review, vol. 33, No. 2, Pasi Sarolahti, et al., Apr. 2003.

Scalable TCP: Improving Performance in Highspeed Wide Area Networks, ACM Computer Communication Review, vol. 33, No. 2, pp. 83-91, Tom Kelly, Apr. 2003.

TCP offload is a dumb idea whose time has come, Proceedings of HotOS IX: The 9th Workshop on Hot Topics in Operating Systems, pp. 25-30, Jeffrey C. Mogul, May 18, 2003.

A case for Virtual Channel Processors, Proceedings of the ACM SIGCOMM 2003 Workshops, Derek McAuley and Rolf Neugebauer, Aug. 2003.

Initial End-to-End Performance Evaluation of 10-Gigabit Ethernet, Proceedings of the 11th Symposium on High Performance Interconnects, Justin Hurwitz and Wu-chun Feng, Aug. 20, 2003.

Workshop on network-I/O convergence: experience, lessons, implications (NICELI), ACM Computer Communication Review, vol. 33, No. 5, Vinay Aggarwal, et al., Oct. 2003.

Optimizing 10-Gigabit Ethernet for Networks ofWorkstations, Clusters, and Grids: A Case Study, Proceeding of the 2003 ACM/IEEE conference on Supercomputing, Phoenix, Arizona, Wu-chun Feng, et al., Nov. 15, 2003.

Performance Comparison of MPI Implementations over InfiniBand, Myrinet and Quadrics, Proceedings of the 2003 ACM/IEEE conference on Supercomputing, Phoenix, Arizona, Jiuxing Liu, et al., Nov. 15, 2003.

Architectural Characterization of TCP/IP Packet Processing on the Pentium M Processor, Proceedings of the 10th International Symposium on High Performance Computer Architecture, pp. 152, Srihari Makineni and Ravi Iyer, Feb. 14, 2004.

FAST TCP: Motivation, Architecture, Algorithms, Performance, Proceedings of IEEE Infocom, pp. 1246-1259, Cheng Jin, et al., Mar. 7, 2004.

TCP Offload to the Rescue, ACM Queue, vol. 2, No. 3, Andy Currid, May 1, 2004.

TCP Onloading for Data Center Servers, Computer, IEEE Computer Society, vol. 37, No. 11, pp. 48-58, Greg Regnier, et al., Nov. 2004.

*Declaration of Dr Gregory L Chesson in Alacritech v. Microsoft*, United States District Court, Northern District California, San Francisco Division, Gregory L. Chesson, Feb. 4, 2005.

Computing Research: A Looming Crisis, ACM Computer Communication Review, vol. 35, No. 2, Edward D. Lazowska and David A. Patterson, Jul. 2005.

Performance Characterization of a 10-Gigabit Ethernet TOE, Proceedings of the 13th Symposium on High Performance Interconnects, W. Feng, et al., Aug. 17, 2005.

User-level device drivers: Achieved performance, J. Comput. Sci. & Technol., vol. 20, B. Leslie, et al., Sep. 2005.

Head-to-TOE Evaluation of High-Performance Sockets Over Protocol Offload Engines, Proceedings of the IEEE International Conference on Cluster Computing, P. Balaji, et al., Sep. 2005.

SCTP versus TCP for MPI, Proceedings of the 2005 ACM/IEEE conference of Supercomputing, Seattle, p. 30, Washington, Humaira Kamal, et al., Nov. 12, 2005.

LTCP: Improving the Performance of TCP in Highspeed Networks, ACM Computer Communication Review, vol. 36, No. 1, pp. 41-50, Sumitha Bhandarkar, et al., Jan. 2006.

Zero-Copy TCP in Solaris, Proceedings of the USENIX Annual Technical Conference, H. K. Jerry Chu, Jan. 1996.

Reflections on Network Architecture: an Active Networking Perspective, ACM Computer Communication Review, vol. 36, No. 2, pp. 27-30, Ken Calvert, Apr. 2006.

10 Networking Papers: Recommended Reading, ACM Computer Communication Review, vol. 36, No. 2, pp. 51-52, Jon Crowcroft, Apr. 2006.

Flow labelled IP over ATM: design and rationale, ACM Computer Communication Review, vol. 36, No. 3, pp. 79-92, Greg Minshall, et al., Jul. 2006.

10 Networking Papers: Readings for Protocol Design, ACM Computer Communication Review, vol. 36, No. 3, pp. 77-78, David Wetherall, Jul. 2006.

A Critique of RDMA, HPCWire article: hpcwire.com/features/17886984.html,Patrick Geoffray, Aug. 18, 2006.

The NE010 iWARP Adapter, Open Fabrics Alliance, Gary Montry, May 2006.

Protocol Onload vs. Offload, Intel, Greg Regnier, Date Unknown.

Protocol Onloading vs. Offloading in High Performance Networks, Pacific Northwest Laboratories by Batelle for the U.S. Department of Energy, Fabrizio Petrini, Date Unknown.

Thoughts about TCP Offloading, My 2003 HotOS paper title: TCP Offload is a dumd idea whose time has to come, HP Labs (Not speaking for HP), Jeff Mogul, Aug. 2006.

Protocol Offloading vs. Onloading in High Performance Networks, Hot Interconnect Panel, System Interconnect Group, Qlogic Corporation, Lloyd Dickman CTO, Aug. 23, 2006.

Protocol off-loading vs. on-loading in high performance networks, Hot Interconnects, Myricom®, Patrick Geoffray, 2006.

Quantifying the Potential Benefit of Overlapping Communication and Computation in Large-Scale Scientific Applications, Proceedings of the 2006 ACM/IEEE conference on Supercomputing, Tampa, Florida, Jose Carlos Sancho, et al., Nov. 11, 2006.

High-Performance and Scalable MPI over InfiniBand with Reduced Memory Usage: An In-Depth Performance Analysis, Proceedings of the 2006 ACM/IEEE conference on Supercomputing, Tampa, Florida, Sayantan Sur, et al., Nov. 11, 2006.

10Gb/s Ethernet Performance and Retrospective, ACM Computer Communication Review, Vol. 37, No. 2, pp. 89-92, Steven Pope and David Riddoch, Mar. 19, 2007.

Getting 10 Gb/s from Xen, Euro-Par Conference 2007, pp. 224-233, Rennes, France, Kieran Mansley, et al., Aug. 28, 2007.

The Parallel Protocol Engine, IEEE/ACM Transactions in Networking vol. 1, Issue 6, pp. 650-663, M. Kaiserswerth, Dec. 1993.

Use of message-based multicomputer components to construct gigabit networks, ACM Computer Communication Review, vol. 23, No. 4, p. 32-44, Danny Cohen, et al., Jul. 1993.

The End of History, IEEE TCGN Gigabit Networking Workshop, J. Evans and T. Buller, Apr. 22, 2001.

The Cambridge Model Distributed System, ACM SIGOPS Operating Systems Review, vol. 14, Issue 1, pp. 21-29, M.V. Wilkes and R.M. Needham, Jan. 1980.

\* cited by examiner

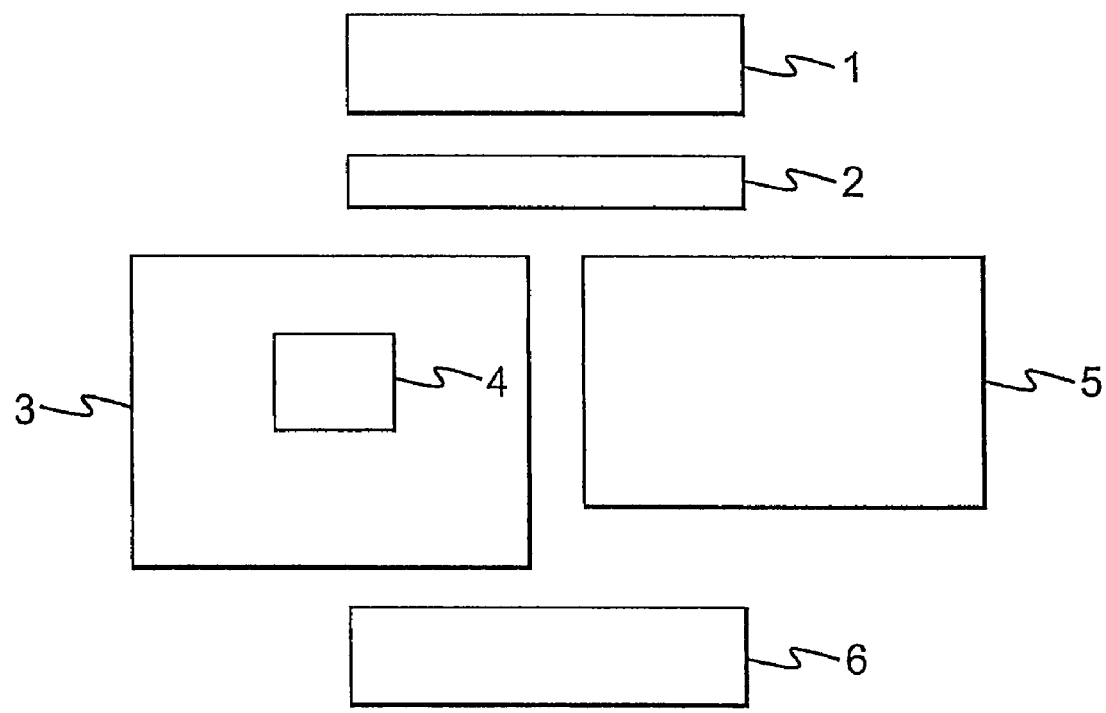

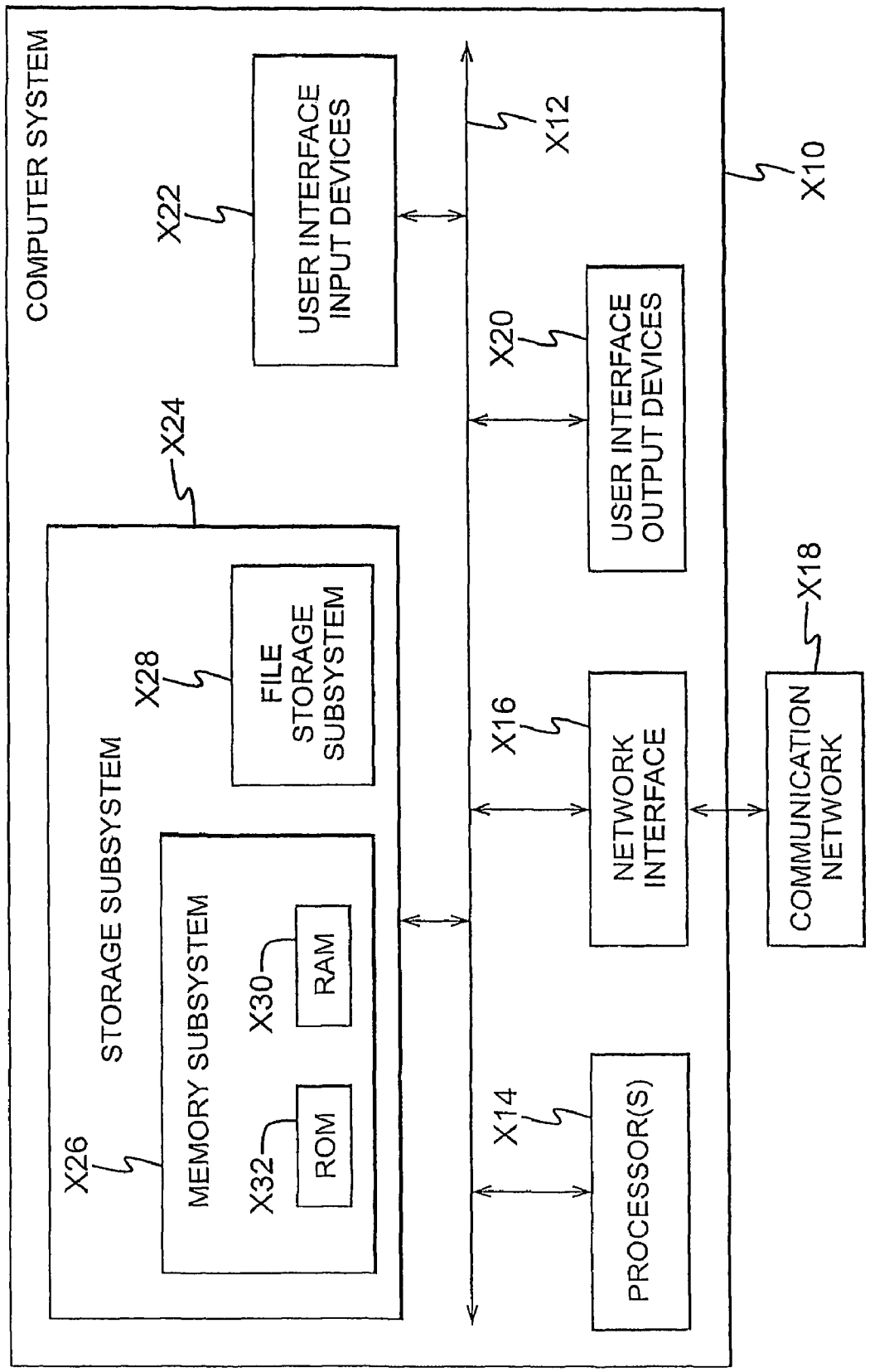

DATA PROCESSING SYSTEM WITH INTERCEPTING INSTRUCTIONS

PRIOR APPLICATION DATA

This application claims priority to U.S. patent application Ser. No. 11/900,377 entitled Data Processing System filed Sep. 10, 2007 which claims priority to PCT Application No. PCT/GB2006/000852 which was published as WO 2006/095184 which is based on and claims priority to Great Britain application number 0505297.2 filed Mar. 15, 2005.

FIELD OF THE INVENTION

This disclosure relates to data processing systems.

RELATED ART

In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

For example, the application can invoke a system call (syscall) for transmission of data through the socket and then via the operating system to the network. Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter. Existing data processing system suffer from various drawbacks in this regard.

In addition, in order to transmit data between data processors in a network such as an Ethernet network, data is formed into packets. Each packet includes a header specifying the destination of the data in the packet. In an Ethernet network the destination is typically specified by means of an Ethernet address, an Internet Protocol (IP) address and a Transmission Control Protocol (TCP) address.

In known network systems it is common for network routing rules to be stored in tables or other data structures such that when a transmission of data is requested the tables can be accessed to determine the appropriate addresses to which to send the data, and the contents of the packet headers can thus be created. Such tables are generally stored by the operating system of the terminal device that is to send the data, for example a personal computer or server.

Layers of the stack include an application and a socket provided by a socket library. The socket library is an application program interface (API) for building software applications. The socket library can carry out various functions, including creating descriptors and storing information. Additionally, there is an operating system (OS) comprising a TCP kernel and a proprietary TCP user-level stack.

In order to perform routing the user-level stack must use a routing table. One option would be for the user-level stack to maintain its own routing tables independently of the OS. However, this would require the user-level stack (in addition to the OS) to have access to all the communications necessary for establishing a routing table. There would then be ambiguity as to where those communications should be directed. Alternatively, the user-level stack may be able to access the routing tables stored by the OS. Since the user-level stack may have to access the tables very frequently during operation, accessing the routing tables stored by the OS is likely to create a significant workload for the system and so it can be expected to be inefficient for an application to be required to access tables in the OS each time it wishes to transmit data across the network. This is a drawback to the prior art.

It is further known that in computer systems, regions of memory are commonly shared between more than one application. Applications which are running are known as processes, and more than one process in a computer may require access to the shared memory at the same time. However, the regions of memory will typically be controlled by means of an operating system which will provide support to enable only one application at a time to access the shared memory space, as discussed in more detail below.

Multiple threads can exist within a single application process and can execute concurrently with access to all the memory of the application context. Thus, there may be multiple threads within each application wishing to access the shared memory. If more than one process or thread were permitted concurrent access to the memory then the application would be likely to crash since the same region of memory cannot be modified simultaneously by more than one set of instructions. Therefore, it is known to provide a lock associated with the memory. The lock can be changed between an unlocked state when no application is accessing the region of memory and a locked state when the memory is being accessed. Thus, when one thread (L) has access to the shared memory, the lock associated with the memory will enter a locked state, indicating that the memory cannot currently be accessed by other threads. When another thread (T) makes an attempt to access the memory while the thread L has access, the thread T will not be permitted access and will need to wait until the memory becomes available.

Spin-locks are commonly used by processes attempting to access shared memory. When a process makes an attempt to access the memory the process will either obtain the lock or it will not. If it fails, a decision must be made about how to proceed. If the process cannot proceed with any other operations until the lock is obtained then it will block and repeatedly attempt to access the memory until the lock is finally obtained. This can obviously be inefficient. An alternative is for the process to request a callback, so that when the lock is released the process is woken and can then re-try the lock. Although this can eliminate the requirement for a process to continually try the lock, it can still be inefficient because the process may not be able to carry out other operations while waiting for the memory access. In other words, it may have to block while waiting for a wake-up from the operating system.

In known systems, attempts made by threads to enter the memory space while it is being used can cause an entry to be added to a queue so as to indicate that the threads are awaiting access to the memory. If the memory is busy then, when it subsequently becomes available, a "wake-up" call can be sent to any waiting threads or applications. The waiting threads or applications are thus alerted to the availability of the memory and can then each make a further attempt to access the memory. Typically, the first thread or application to attempt to access the memory will be given access, although other scheduling algorithms are employed where appropriate. When an application successfully engages the memory, the lock will enter a locked state and access to the memory will be prevented to other applications.

It is also known for an application, on releasing a lock, to send a system call (syscall) to a driver within the operating system to initiate the sending of a wake-up call to waiting applications. The driver on receiving a syscall instructing a wake-up call, would access the queue to determine which applications are waiting, and send wake-up calls to the appropriate applications.

This arrangement has the following disadvantages. First, it can be inefficient for applications to have to make repeated attempts to access the memory. Second, some applications will have a higher priority than others and it can be very inefficient for a high priority application to be made to wait and make several access attempts before being permitted access to the memory. For example, an application may be blocked until it can access the memory, and it can therefore be important for that application to be treated as a high priority. Also the priority of all the waiting threads cannot be easily expressed in terms of the Operating System level inputs to the scheduling algorithm and is only known (or expressed) by the particular application and driver code.

Various embodiments are disclosed herein for overcoming the drawbacks in the prior art and for providing additional advantages and benefits for data processing systems and the methods associated therewith.

SUMMARY

To overcome the drawbacks of the prior art and provide additional benefits and features, a data processing system is disclosed. In one embodiment the system comprises an operating system for supporting processes such that each process is associated with one or more resources. The operating system is arranged to police the accessing by processes of resources so as to inhibit a process from accessing resources with which it is not associated, and being responsive to instructions of a certain type to re-initialize a process. Also part of this embodiment is an interface for interfacing between each process and the operating system. A memory is provided for storing state information for at least one process such that the state information is associated with a resource. In addition, the interface is arranged to analyze instructions from the processes to the operating system, upon detecting an instruction to re-initialize a process so as to be associated with a resource that is associated with pre-existing state information. This causes state information corresponding to that pre-existing state information to be stored in the memory as state information for the re-initialized process and to be associated with the resource.

Also disclosed herein is a data processing system comprising an operating system that stores a first network routing table that comprises one or more entries each indicating at least part of a route over a network to a respective destination. This system also comprises a transmission support function arranged to maintain a copy of the first network routing table and a network data transmission function arranged to transmit data in accordance with the copy network routing table and without accessing the first network routing table.

Also disclosed herein is a data processing system is arranged to control access by a plurality of processes to a region of shared memory. In such an embodiment, the data processing system is configured to prevent more than one process from concurrently accessing the region of shared memory and establish a data structure for holding items of a first type. These each comprise an indication of another of the plurality of processes, which are attempting to access the region of shared memory, and a definition of an operation on the region of shared memory. In addition, on a process finishing accessing the region of shared memory, action an item in the data structure by performing the defined operation by other than the process indicated in that item.

Also disclosed herein is a method of compiling a data structure in a computer system such that the computer system is arranged to perform protocol processing and transmit data via an interface on the basis of instructions in accordance with a route. In one embodiment this method comprises receiving a first instruction including an indication of a descriptor and determining a route indicated by the first instruction. This method also identifies an interface within the determined route and attempts to determine the ownership of the interface. As a result, this method causes an entry to be made in the data structure such that the entry includes an identifier of the descriptor and a state of the descriptor, wherein the state represents the result of the attempting step.

In one embodiment, the data processing system comprises an operating system for supporting processes such that the operating system is arranged to output data by addressing the data to a descriptor corresponding to the intended destination of the data. A memory is provided including one or more address spaces and there is an address space corresponding to each of the processes for use by the respective process. Also, a data communication stack is provided or created for one of the processes such that the stack is located in the address space corresponding to the respective process and having a descriptor allocated to it. The stack may be implemented at user-level if so desired. In other embodiments, each process may be associated with a corresponding stack. Additionally, the operating system may flag the descriptor allocated to the stack as being allocated to the stack.

Included in this embodiment is an interface for interfacing between each process and the operating system. The interface may take various forms including but not limited to a library or an application program interface. In addition, a data carrier may be used to store program data defining an interface. Generally, the interface is arranged to identify whether requests to alter the allocation of a descriptor sent by the processes towards the operating system relate to altering the allocation of the descriptor allocated to the stack, and if it does, allocate a different descriptor to the stack and subsequently permit the request to be processed. In one or more embodiments, this request may be a Dup2( ) system call.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 3 shows a computer system in accordance with embodiments of the present invention.

FIG. 4 shows a descriptor table.

FIG. 5 shows hardware suitable for use with embodiments of the invention.

DETAILED DESCRIPTION

The embodiments of the invention described herein may include any one or more of the features described in relation to other inventions. As such various different embodiments may be configured with any element, feature, or step, disclosed herein, either alone or in combination.

This invention relates to directing instructions in computer systems. In the field of computer systems it is generally necessary to determine an appropriate path by which to transmit instructions between elements of a computer. Typically the path is defined by the operating system running on the computer, but it is known that other processes can intervene in some situations to alter the path that instructions take. For example an application which wishes to use a hot-pluggable input-output device will take an instruction path which is determined by a hot-plug controller device according to the particular device which is resident in the system at that time.

Figure 1:
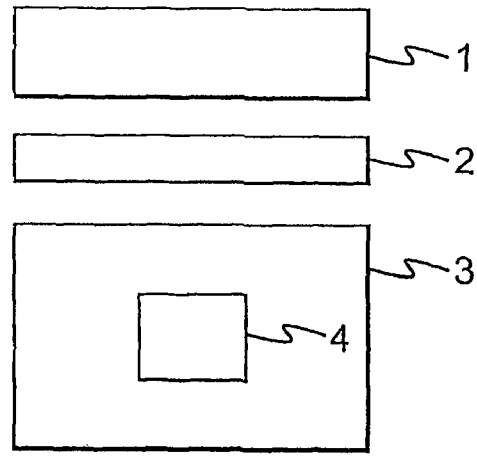
FIG. 1 shows a prior art computer system.

FIG. 1 represents equipment capable of implementing a prior art protocol stack, such as a transmission control protocol (TCP) stack in a computer connected to a network. The equipment includes an application 1, a socket 2 and an operating system 3 incorporating a kernel 4. The socket connects the application to remote entities by means of a network protocol, in this example TCP/IP. The application can send and receive TCP/IP messages by opening a socket and reading and writing data to and from the socket, and the operating system causes the messages to be transported across the network. For example, the application can invoke a system call (syscall) for transmission of data through the socket and then via the operating system to the network.

Syscalls can be thought of as functions taking a series of arguments which cause execution of the CPU to switch to a privileged level and start executing the operating system. A given syscall will be composed of a specific list of arguments, and the combination of arguments will vary depending on the type of syscall.

Syscalls made by applications in a computer system can indicate a file descriptor (sometimes called a Handle), which is usually an integer number that identifies an open file within a process. A file descriptor is obtained each time a file is opened or a socket or other resource is created. File descriptors can be re-used within a computer system, but at any given time a descriptor uniquely identifies an open file or other resource. Thus, when a resource (such as a file) is closed down, the descriptor will be destroyed, and when another resource is subsequently opened the descriptor can be re-used to identify the new resource. Any operations which for example read from, write to or close the resource take the corresponding file descriptor as an input parameter.

When a network related application program interface (API) call is made through a socket library this causes a system call to be made, which creates (or opens) a new file descriptor. For example the accepts system call takes as an input a pre-existing file descriptor which has been configured to await new connection requests, and returns as an output a newly created file descriptor which is bound to the connection state corresponding to a newly made connection. The system call when invoked causes the operating system to execute algorithms which are specific to the file descriptor. Typically there exists within the operating system a descriptor table which contains a list of file descriptors and, for each descriptor, pointers to a set of functions that can be carried out for that descriptor. Typically, the table is indexed by descriptor number and includes pointers to calls, state data, memory mapping capabilities and ownership bits for each descriptor. The operating system selects a suitable available descriptor for a requesting process and temporarily assigns it for use to that process.

Certain management functions of a computing device are conventionally managed entirely by the operating system. These functions typically include basic control of hardware (e.g. networking hardware) attached to the device. When these functions are performed by the operating system the state of the computing device's interface with the hardware is managed by and is directly accessible to the operating system. An alternative architecture is a user-level architecture, as described in the applicant's co-pending applications WO 2004/079981 and WO 2005/104475. In a user-level architecture at least some of the functions usually performed by the operating system are performed by code running at user level. In a user-level architecture at least some of the state of the function can be stored by the user-level code. This can cause difficulties when an application performs an operation that requires the operating system to interact with or have knowledge of that state.

In embodiments of the present invention syscalls passing through the socket can be analyzed to establish the file descriptor and any information identified in the syscall that indicates the path by which the syscall is to be directed, and decisions can thereby be made by the socket so that the syscall can be transmitted in a suitable way from the socket.

An example of a syscall is Dup2(a,b), which has the effect of duplicating the file or other resource represented by descriptor "a" and creating a new resource represented by descriptor "b" and having the same properties. One example of when such a call might be useful is when a descriptor that has a system-wide significance (for example the descriptor that maps on to error output—commonly descriptor #2) is to be redirected on to some other file or device.

Other examples of syscalls are fork( ) and exec( ). A fork( ) call typically creates a new process (child) from the old one (parent) which initially shares all state including memory mappings and file-descriptors. After a successful fork( ), two copies of the original code will be running. An exec( ) call can then be requested for the child process. This will replace the current process image with a new process image, but details of the child process can be preserved. For example, specific file descriptors can be preserved in the child and (often) closed by the parent; thus handing over control of a file descriptor from a parent to a new child process.

According to a first aspect of the present invention there is provided a data processing system comprising: an operating system for supporting processes, the operating system being arranged to output data by addressing the data to a descriptor corresponding to the intended destination of the data; an interface for interfacing between each process and the operating system; a memory including one or more address spaces, there being an address space corresponding to each of the processes for use by the respective process; and a data communication stack for one of the processes, the stack being located in the address space corresponding to the respective process and having a descriptor allocated to it; the interface being arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

In the context of this invention, the allocation of a descriptor to a stack may mean the association between the stack and the descriptor that results in the stack being responsible for performing operations related to that descriptor. Specific examples of such associations are given below.

The request could suitably be a Dup2( ) system call, and the changing of the descriptor allocated to the stack could suitably be carried out by means of a Dup2( ) system call. A failure of the changing of the descriptor by means of a Dup2( ) system call is preferably reported to the respective process as a failure of the request. Each process is preferably associated with a corresponding stack. The descriptor allocated to the stack could be flagged by the operating system as being allocated to a stack. The stack could suitably be implemented at user-level. The interface may be a library, and it may be an application program interface.

According to a second aspect of the present invention there is provided an interface for a data processing system comprising an operating system for supporting processes, the operating system being arranged to output data by addressing the data to a descriptor corresponding to the intended destination of the data and a memory including one or more address spaces, there being an address space corresponding to each of the processes for use by the respective process; and a data communication stack for one of the processes, the stack being located in the address space corresponding to the respective process and having a descriptor allocated to it; the interface being for interfacing between each process and the operating system and being arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed.

According to a third aspect of the present invention there is provided a data carrier storing program data defining an interface as defined above. According to a fourth aspect of the present invention there is provided a method for processing requests sent by processes in a data processing system comprising: an operating system for supporting processes, the operating system being arranged to output data by addressing the data to a descriptor corresponding to the intended destination of the data; an interface for interfacing between each process and the operating system; a memory including one or more address spaces, there being an address space corresponding to each of the processes for use by the respective process; and a data communication stack for one of the processes, the stack being located in the address space corresponding to the respective process and having a descriptor allocated to it; the method comprising the steps of analyzing requests to alter the allocation of a descriptor sent by the processes towards the operating system to identify whether such a request relates to altering the allocation of the descriptor allocated to the stack; and if it does, allocating a different descriptor to the stack and subsequently permitting the request to be processed.

FIG. 5 is a simplified block diagram of a computer system X10 suitable for use with embodiments of the present invention. Computer system X10 typically includes at least one processor X14 which communicates with a number of peripheral devices via bus subsystem X12. These peripheral devices may include a storage subsystem X24, comprising a memory subsystem X26 and a file storage subsystem X28, user interface input devices X22, user interface output devices X20, and a network interface subsystem X16. The input and output devices allow user interaction with computer system X10. Network interface subsystem X16 provides an interface to outside networks, including an interface to communication network X18, and is coupled via communication network X18 to corresponding interface devices in other computer systems. Communication network X18 may comprise many interconnected computer systems and communication links. These communication links may be wireline links, optical links, wireless links, or any other mechanisms for communication of information. While in one embodiment, communication network X18 is the Ethernet, in other embodiments, communication network X18 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices X22 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system X10 or onto computer network X18.

User interface output devices X20 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system X10 to the user or to another machine or computer system.

Storage subsystem X24 stores the basic programming and data constructs that provide the functionality of certain embodiments of the present invention. For example, the various modules implementing the functionality of certain embodiments of the invention may be stored in storage subsystem X24. These software modules are generally executed by processor X14.

Memory subsystem X26 typically includes a number of memories including a main random access memory (RAM) X30 for storage of instructions and data during program execution and a read only memory (ROM) X32 in which fixed instructions are stored. File storage subsystem X28 provides persistent storage for program and data files, and may include a hard disk drive, a floppy disk drive along with associated removable media, a CD-ROM drive, an optical drive, or removable media cartridges. The databases and modules implementing the functionality of certain embodiments of the invention may be stored by file storage subsystem X28. A host memory contains, among other things, computer instructions which, when executed by a processor subsystem, cause the computer system to operate or perform functions as described herein.

Bus subsystem X12 provides a mechanism for letting the various components and subsystems of computer system X10 communicate with each other as intended. Although bus subsystem X12 is shown schematically as a single bus, alternative embodiments of the bus subsystem may use multiple busses.

Computer system X10 itself can be of varying types including a personal computer, a portable computer, a workstation, a computer terminal, a network computer, a television, a mainframe, or any other data processing system or user device. Due to the ever-changing nature of computers and networks, the description of computer system X10 depicted in FIG. 5 is intended only as a specific example for purposes of illustrating the preferred embodiments of the present invention. Many other configurations of computer system X10 are possible having more or less components than the computer system depicted in FIG. 5.

A typical computer system includes a processor subsystem (including one or more processors), a memory subsystem (including main memory, cache memory, etc.), and a variety of "peripheral devices" connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

Most modern computer systems are multitasking, meaning they allow multiple different application programs to execute concurrently on the same processor subsystem. Most modern computer systems also run an operating system which, among other things, allocates time on the processor subsystem for executing the code of each of the different application programs. One difficulty that might arise in a multitasking system is that different application programs may wish to control the same peripheral device at the same time. In order to prevent such conflicts, another job of the operating system is to coordinate control of the peripheral devices. In particular, only the operating system can access the peripheral devices directly; application programs that wish to access a peripheral device must do so by calling routines in the operating system. The placement of exclusive control of the peripheral devices in the operating system also helps to modularize the system, obviating the need for each separate application program to implement its own software code for controlling the hardware.

The part of the operating system that controls the hardware is usually the kernel. Typically it is the kernel which performs hardware initializations, setting and resetting the processor state, adjusting the processor internal clock, initializing the network interface device, and other direct accesses of the hardware. The kernel executes in kernel mode, also sometimes called trusted mode or a privileged mode, whereas application level processes (also called user level processes) execute in a user mode. Typically it is the processor subsystem hardware itself which ensures that only trusted code, such as the kernel code, can access the hardware directly. The processor enforces this in at least two ways: certain sensitive instructions will not be executed by the processor unless the current privilege level is high enough, and the processor will not allow user level processes to access memory locations (including memory mapped addresses associated with specific hardware resources) which are outside of a user-level physical or virtual address space already allocated to the process. As used herein, the term "kernel space" or "kernel address space" refers to the address and code space of the executing kernel. This includes kernel data structures and functions internal to the kernel. The kernel can access the memory of user processes as well, but "kernel space" generally means the memory (including code and data) that is private to the kernel and not accessible by any user process. The term "user space", or "user address space", refers to the address and code space allocated by a code that is loaded from an executable and is available to a user process, excluding kernel private code data structures. As used herein, all four terms are intended to accommodate the possibility of an intervening mapping between the software program's view of its own address space and the physical memory locations to which it corresponds. Typically the software program's view of its address space is contiguous, whereas the corresponding physical address space may be discontiguous and out-of-order, and even potentially partly on a swap device such as a hard disk drive.

Although parts of the kernel may execute as separate ongoing kernel processes, much of the kernel is not actually a separate process running on the system. Instead it can be thought of as a set of routines, to some of which the user processes have access. A user process can call a kernel routine by executing a system call, which is a function that causes the kernel to execute some code on behalf of the process. The "current process" is still the user process, but during system calls it is executing "inside of the kernel", and therefore has access to kernel address space and can execute in a privileged mode. Kernel code is also executed in response to an interrupt issued by a hardware device, since the interrupt handler is found within the kernel. The kernel also, in its role as process scheduler, switches control between processes rapidly using the clock interrupt (and other means) to trigger a switch from one process to another. Each time a kernel routine is called, the current privilege level increases to kernel mode in order to allow the routine to access the hardware directly. When the kernel relinquishes control back to a user process, the current privilege level returns to that of the user process.

When a user level process desires to communicate with the NIC, conventionally it can do so only through calls to the operating system. The operating system implements a system level protocol processing stack which performs protocol processing on behalf of the application. In particular, an application wishing to transmit a data packet using TCP/IP calls the operating system API (e.g. using a send( ) call) with data to be transmitted. This call causes a context switch to invoke kernel routines to copy the data into a kernel data buffer and perform TCP send processing. Here protocol is applied and fully formed TCP/IP packets are enqueued with the interface driver for transmission. Another context switch takes place when control is returned to the application program. Note that kernel routines for network protocol processing may be invoked also due to the passing of time. One example is the triggering of retransmission algorithms. Generally the operating system provides all OS modules with time and scheduling services (driven by the hardware clock interrupt), which enable the TCP stack to implement timers on a per-connection basis. The operating system performs context switches in order to handle such timer-triggered functions, and then again in order to return to the application.

It can be seen that network transmit and receive operations can involve excessive context switching, and this can cause significant overhead. The problem is especially severe in networking environments in which data packets are often short, causing the amount of required control work to be large as a percentage of the overall network processing work.

One solution that has been attempted in the past has been the creation of user level protocol processing stacks operating in parallel with those of the operating system. Such stacks can enable data transfers using standard protocols to be made without requiring data to traverse the kernel stack.

FIG. 3 shows components implementing a TCP stack for use in accordance with embodiments of the present invention. Layers of the stack include an application 1 and a socket 2 provided by a socket library. In general, a library is a collection of routines. The term is commonly used to refer to a collection of standard programs and routines that can be used by processes running in a computer system. In the context of FIG. 3, a socket library is an application program interface (API) for building software applications. The socket library can carry out various functions, including creating descriptors and storing information. Additionally, there is an operating system 3 comprising a TCP kernel 4, and a proprietary TCP user-level stack 5. It will be understood by the skilled person that although TCP is referred to by way of example, other protocols could also be used in accordance with embodiments of the invention. For example, User Datagram Protocol (UDP), Internet Control Message Protocol (ICMP) or Real-Time Transport Protocol (RTP) could be used. Non-Ethernet protocols could be used. The user-level stack is connected to hardware 6 in FIG. 3. The hardware could be a network interface card (NIC).

In this arrangement there can be one user-level TCP stack 5 for each application that requires one. This can provide better performance than if a stack is shared between applications. Each stack is located in the same address space as the application that it serves. In alternative implementations, multiple applications can use a single stack, or a stack could be split so that there are multiple stacks per application if necessary.

The socket library maintains a table 40, shown in FIG. 4, incorporating identifiers of file descriptors and their ownership. In general, the term ownership applies to control of access to elements within a computer system. For example, a network interface 6 (typically a port on a network interface card) could link a data processing system to a series of other computers, and the data processing system could be similarly linked by a further network interface to another series of computers. If it is desired to send a packet of data from the data processing system to a specific one of the computers, the correct network interface must be selected in order to successfully transmit the packet to the correct computer. In this case, the term "ownership" refers to the identity of the interfaces. Thus "ownership" can refer to the allocation of a resource to an entity such as a process or a stack, which may imply that access to that resource is limited to that entity. It is used in this general sense herein, and in some embodiments of the invention the term "owner" can refer more specifically to the process that has responsibility for managing a resource associated with a file descriptor. Ownership of a file descriptor by a stack can refer to the responsibility that the stack has for performing operations on behalf of a process indicating that file descriptor in instructions sent by the process. Resources could suitably include memory, protocol processing stacks, data structures, NICs and NIC drivers.

In embodiments of the invention, the right of a process to access a resource is defined by the allocation (or ownership) of file descriptors. A file descriptor can be allocated by the OS to a process. The file descriptor is typically associated with a particular resource or a plurality of resources. By allocating the file descriptor to the process, access to the corresponding resources by the process is enabled. Ownership of a file descriptor by a process, and thus access to the resource or resources corresponding to the descriptor, may (although need not) imply unique access of the process to the resource(s). For example, a process may own a file descriptor identifying an established communication channel to a remote computer. The file descriptor may be the only file descriptor in the data processing system that is assigned to that communication channel. The OS may be configured to deny ownership of that file descriptor to any other processes concurrently, thereby providing sole access of the communication channel to the process. However, in other embodiments, multiple processes may be provided with concurrent ownership of the same file descriptor.

In the present example illustrated by FIG. 3, the computer system has a kernel (K) 4 and a proprietary user-level stack 5 which will be referred to (by way of example only) as a Level 5 (or L5) stack. The L5 stack is associated with its own library which is interposed in the system. The ownership of file descriptors in use in the system is defined according to which network interface the file descriptor is associated with. The descriptor table maintained by the socket library indicates whether each descriptor is owned by L5, owned by K, or of ownership currently unknown to the socket library. Thus, in this case, the ownership can have three values: L5; K; or unknown/indeterminate. These values could be indicated explicitly or by way of binary flags. Exemplary entries in the table 40 are shown in FIG. 4. The descriptor numbers are listed in the left column and an indication of the ownership of each descriptor (as determined by the socket library) is shown in the right column. Thus, the table shows that descriptor number 0 has been determined to be owned by L5, the ownership of descriptor numbers 3 and 6 is currently unknown to the socket library, and descriptor number 4 is owned by the kernel. The table 40 is preferably stored securely such that users cannot access it directly and corrupt it by changing pointers in the table, for example by using read only memory mapping. It may suitably be stored in user address space.

Figure 2:
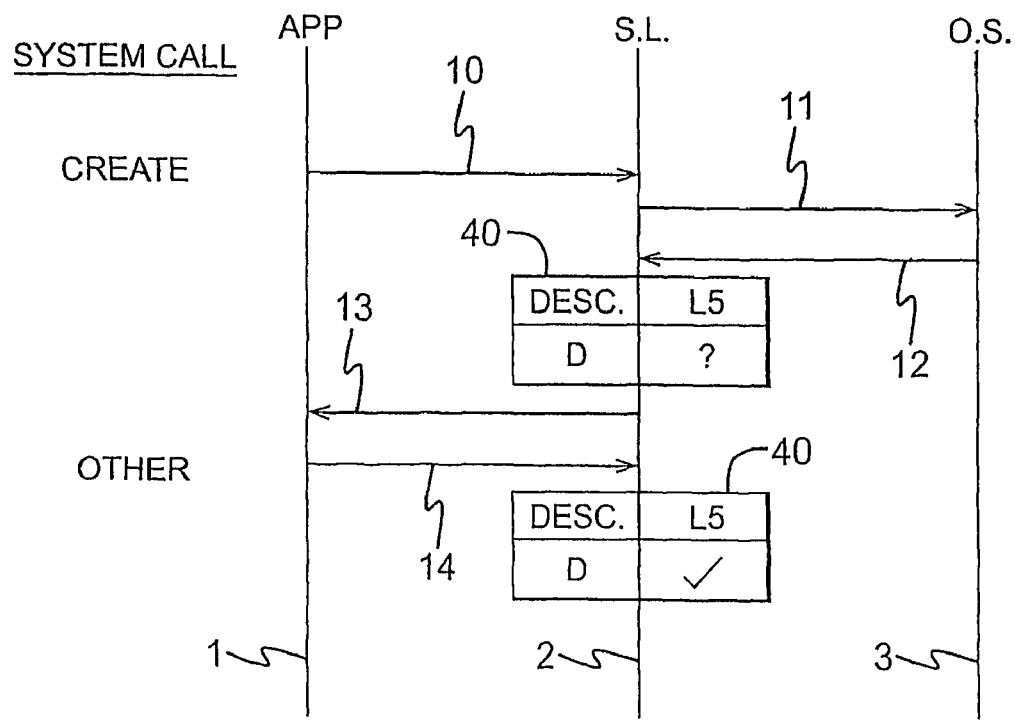
FIG. 2 represents a series of operations in a computer system.

In FIG. 2, a series of operations is illustrated. An application 1 invokes a socket( ) syscall 10 through the socket API 2, requesting that a new file descriptor be created. This could alternatively be achieved for example by using an open( ) call. In the present example, the application could be a webserver which creates a new descriptor which accepts new connections and then forks( ) a new process for each concurrent user. In the example, the server is initializing, and so a socket( ) call is made by the application.

At step 11 the socket library, which may be a standalone library or alternatively its functionality could be incorporated in a single system library such as libc, invokes a syscall trap which causes execution to switch to the operating system. The operating system determines the syscall source and executes internal socket creation code within its network subsystem. This code will request a new file descriptor. The operating system checks its descriptor table and selects a descriptor D suitable for this application and then assigns it to the new file associated with the new user. An identifier of the selected descriptor D is then sent in step 12 by the operating system 3 to the socket 2.

In prior art systems, the passing of the syscall from the application to the socket library, and the invoking of the resulting system call at the socket is generally unhindered. In contrast, in the present system, the call is intercepted before it reaches the socket library. The intercepted message 12 is checked by the L5 socket library, and an identifier of the descriptor D is entered in the table 40, with an initial indication of indeterminate (unknown) ownership. An extract of the table 40 is shown below step 12 in FIG. 2.

An identifier of the descriptor D in the message 12 is then transmitted to the requesting application 1 in step 13. The application may then include this descriptor in further syscalls which it transmits, enabling the relevant resource to be identified.

In this embodiment, a network route table is maintained by the operating system 3 storing arguments and their associated routes including interfaces within the routes. The network route table typically stores network subnet address masks and their associated network interfaces. A given network address is matched against the table in such a way that the most specifically defined route can be chosen.

This table contains all external network routing rules for the computer system. The table is also associated with an API which enables entries in the table to be added or deleted. Because the route table is held in the OS a user-level stack would waste time making system calls to determine the route of packets being transmitted. To avoid this, a local copy of the route table (and other control plane tables such as the list of network interfaces and the address resolution protocol (ARP) table) is maintained in the context of the user-level application. In the system of this example, the L5 stack is registered with the operating system to receive updates when the route table changes. The table is thereby copied into the L5 stack and if an application's route changes, the relevant information will be relayed to the L5 stack.

The L5 user-level stack provides a "look up route" function which, on receiving a request, can return details of whether or not a specified route goes through an interface associated with the L5 stack (in this example an L5 interface). This function will check a generation count to determine whether its cached route table state is still valid. If so it can use cached state, otherwise it needs to either make a system call or consult shared memory pages onto valid route table entries.

In step 14, another syscall is sent from the application 1. In this example it is a connect( ) syscall, specifying an address for connection which could be in another machine. The socket library 2 intercepts the message 14, determines the type of syscall and looks it up in a further table. If it is a type from which it will not be possible to determine the ownership of a descriptor, no further processing of the message is performed to establish the ownership. An entry already exists in the table 40 for the descriptor D, and the ownership indicated in the table will remain unchanged, as indeterminate. Information and the descriptor D in the message 14 will then be checked by the socket 2 to establish whether the message should be passed to the kernel or the L5 stack, and it will then be transmitted within the system to the appropriate interface.

On the other hand, if the syscall 14 is determined by the socket library to be of a type that could identify the ownership of the descriptor, the syscall will be further analyzed. In the present example, the message is a connect request and so it will be further analyzed. This analysis includes identifying the descriptor D and any arguments included in the message. The arguments can then be analyzed by the socket library by means of a "look up route" request. The route table copied into the L5 stack will then be checked and an associated interface can thereby be identified. The ownership of the descriptor D is assumed to be the same as that of the interface, and the ownership data in the table 40 against descriptor D can then be updated. The socket library can thus identify whether the descriptor should be passed to the operating system 3 (or, more specifically, the kernel 4) or to the proprietary user-level stack 5. In the present example, the syscall 14 is determined to be directed to a L5 interface, and the descriptor D is therefore taken to be a L5 descriptor. The table 40 is updated with a positive indication of L5 ownership, as shown below step 14 in FIG. 2, and the syscall will be passed to the L5 stack which will perform the required operation within the application context.

When a subsequent message identifying descriptor D passes through the socket 2, the socket library can simply determine the descriptor from the message and look up that descriptor in the locally stored table 40 to determine its presumed ownership. Messages incorporating a descriptor owned by L5 will be intended to be passed directly down from the socket 2 to the L5 user-level stack 5 shown in FIG. 3. Because the ownership of the descriptor D is determined from the table 40 as being L5, messages intercepted by the socket library incorporating an identifier of the descriptor D will be passed directly down to the L5 stack 5 without first being sent to the operating system 3. Therefore, by means of embodiments of the present invention, only a simple analysis of a message passing through the socket library is required in order to be able to establish the appropriate part of the stack to which to pass the message. The high overhead in processing instructions to determine a path is thereby avoided. Preferably, if the ownership of a descriptor is recorded by the socket library as indeterminate, any message incorporating that descriptor will be sent to the operating system by default.

Figure 6:
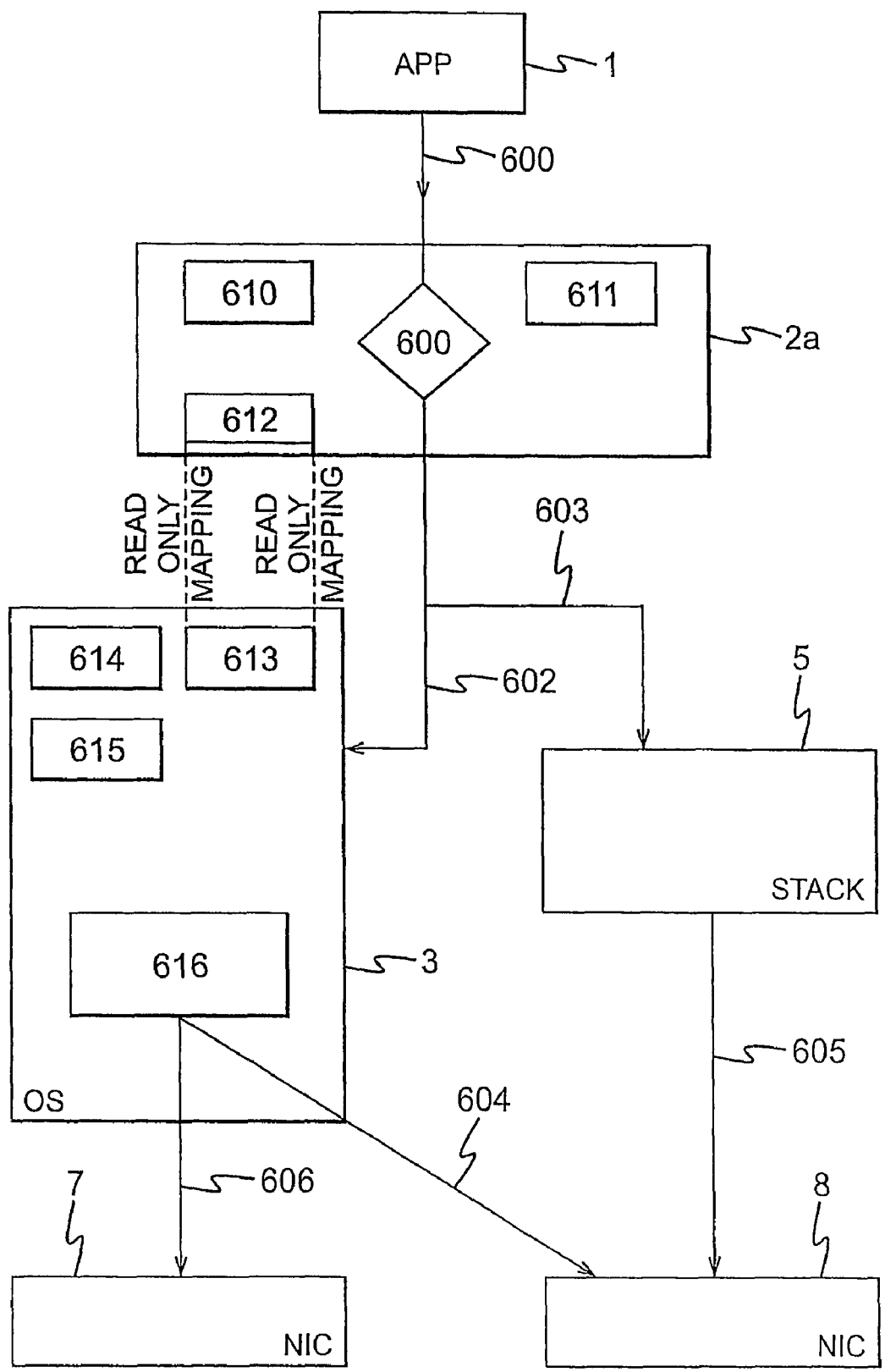
FIG. 6 is a schematic representation of a routing mechanism.

FIG. 6 illustrates the routing procedure described above in more detail. An application 1 issues a syscall or other message 600 within a data processing system comprising a user-level stack 5, an operating system 3 and NICs 7 and 8. In this example the message is a request (such as a send( ) syscall) for the transmission of data to a remote device. The message 600 is intercepted by an interception layer 2a. The interception layer may be a library (such as the socket library 2 of FIG. 2) but the functionality of the interception layer could be implemented in any suitable way.

A decision 609 is taken by the interception layer 2a in order to determine the subsequent routing of the message 600 within the data processing system. Specifically, a descriptor table 610 listing the ownership of file descriptors in use in the data processing system is checked by the interception layer. The table could be of the form shown in FIG. 4, but more generally can be any data structure holding information detailing the allocation of the file descriptors as described above. If the interception layer determines that the file descriptor is owned by the user-level stack 5 then the message 600 is routed directly to the stack by path 603. The message is then processed by user-level transport routines and data is passed by path 605 to a NIC 8 associated with the stack 5. In a specific example, the NIC 8 could be a proprietary NIC that is supported by corresponding code in the stack 5.

If, at decision 609, the interception layer instead determines that the file descriptor is owned by the kernel then the message is routed by path 602 to the OS 3. Kernel transport routines 616 perform the required protocol processing on the data indicated in the message 600, and the data is then passed by path 606 or path 604 to a NIC for transmission over a network. Instead of being separate pieces of hardware, the items shown as 7 and 8 in FIG. 6 could be separate ports on a single piece of hardware, for example arranged for transmitting data processed by the kernel and by the user-level stack 5 respectively.

To enable efficient operation of the above routing mechanism, the sharing of routing information between the OS and the stack 5 as described above is desirable. FIG. 6 shows a routing table 615 held by the OS, together with a copy of that routing table 611 held locally by the interception layer 2*a*. The OS also has a table (or other data structure) 614 maintaining details of the allocation of all file descriptors in use in the system, as described above. A local table 610 is held by the interception layer 2*a* storing a list of file descriptors in use together with an indication of their ownership as determined by the interception layer during an interception process as described above in relation to FIG. 2. Furthermore, a generation count 613 is maintained by the OS, and this is mapped (preferably in a read-only manner) onto a similar count 612 at the interception layer.

Figure 7:
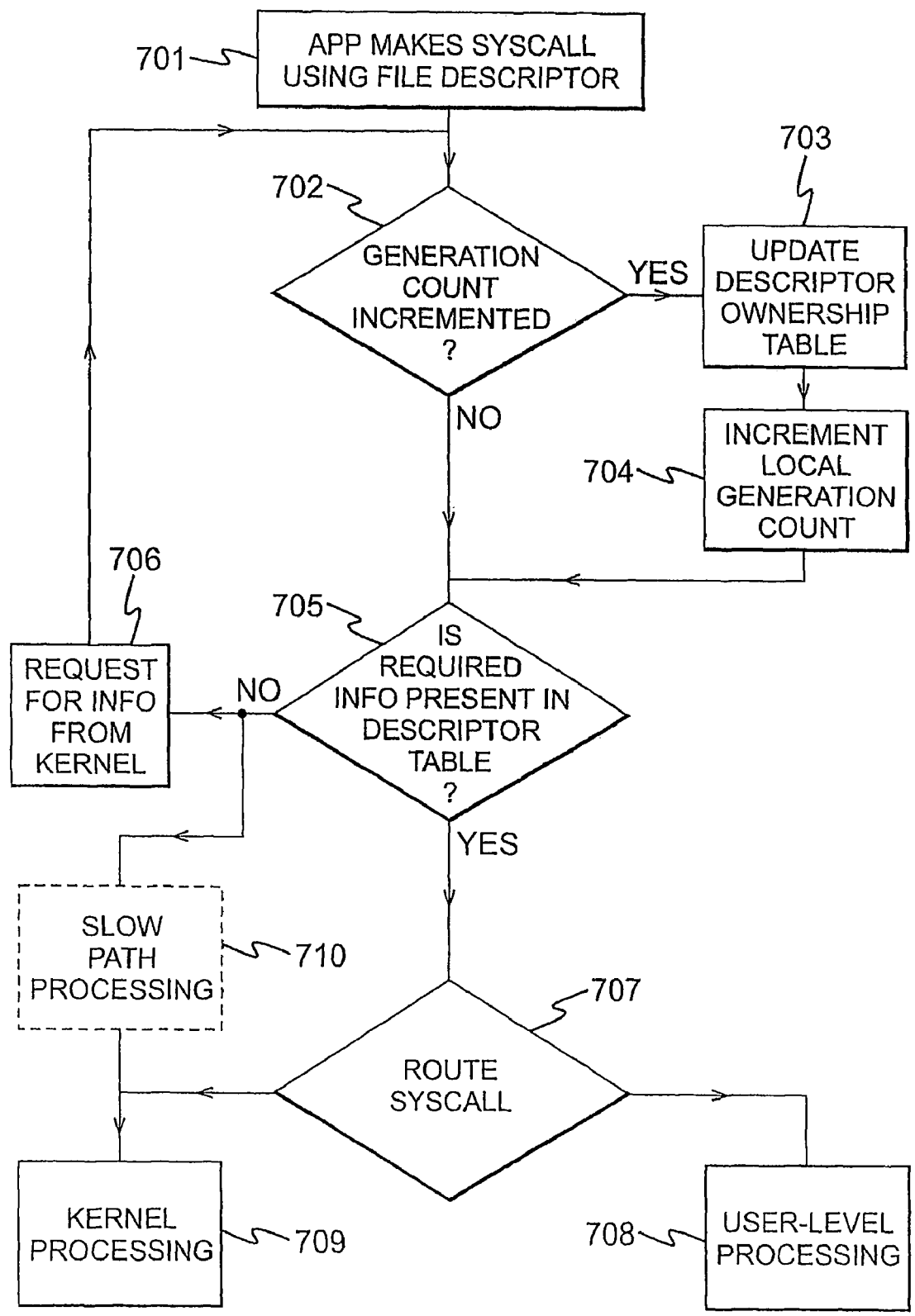
FIG. 7 is a flow diagram illustrating the routing mechanism of FIG. 6.

FIG. 7 shows more detail of the routing mechanism illustrated in FIG. 6. In a step 701 an application issues a message such as a syscall. The message is intercepted by an interception layer 2*a* such as a socket library, and a check is made in step 702, preferably by reference to the local generation counter 612, to determine whether the information currently held in the interception layer's descriptor ownership table 40 is up-to-date. If the generation counter has been incremented since the table 40 was last known to be up-to-date, then the table may need to be refreshed, as discussed below in the discussion of routing and policy changes. In this case, the currently stored table is updated in step 703 and the local generation counter 612 is incremented in step 704 to indicate that a change has been made to the table 40. Updated ownership information can be acquired by the interception layer by means of the mechanism described above with reference to FIG. 2. The routing mechanism can then proceed in step 705, discussed below.

In one embodiment, generation counters could be provided on a per-descriptor basis such that the entire descriptor table 40 need not be updated if the routing requirements have changed in respect of one descriptor only.

If at check 702 it is determined by the interception layer that the information held in the descriptor table 40 is up-to-date then that information may be used, and the mechanism proceeds to step 705.

In step 705, the interception layer checks the content of the descriptor table 40 to determine whether it has identified the ownership of the file descriptor referenced in the message 701. If so then the routing can proceed in step 707 by the fast-path method described above, whereby the ownership of the descriptor is used as a representation of the desired path of the message 701 as indicated by the routing table 615 of the OS (or the local copy 611 at the interception layer 2*a*).

If at step 705 it is determined that the descriptor table 40 does not contain the ownership of the file descriptor referenced in the message 701 then alternative processing is required for the message. This may involve requesting information from the kernel in a step 706, or it may involve routing the message according to a default slow-path procedure, suitably passing it in a step 710 to the OS which can then look up the required route for that message using its routing table 615.

Referring again to the descriptor table 40 illustrated schematically in FIG. 4, when a file is to be closed, a destructor syscall (usually close( )) is sent from the application 1 and intercepted by the socket library 2. The socket library can then identify that the descriptor is to be destroyed and remove the entry for that descriptor from the table 40. Then, when the descriptor is subsequently re-used by the operating system and assigned to a new process, the socket library can intercept the message from the operating system identifying the newly-assigned descriptor, as described above in relation to step 12 of FIG. 2. Alternatively, the entry could remain in the table and the associated indication of its ownership could be modified to show that its ownership is unknown to the socket library. Alternatively, the default setting for a descriptor's ownership could be "operating system".

The information stored in the table 40 may become obsolete when routing instructions within the computer system change. This could happen as a result of policy changes, for example when an application no longer runs with Level 5, or, more commonly, as a result of load balancing decisions within the computer system or other route updates caused by network topology changes. The information in the table 40 should be checked when such a change occurs. A convenient way of arranging the checking procedure is to reset a descriptor's ownership to indeterminate (or K) when such a change occurs so that until the correct new ownership information can be obtained a full processing operation will be carried out for the routing of messages to the operating system or the L5 stack via the socket 2. More generally a single generation counter is associated with each user-level socket state. Incrementing this counter will cause the L5 user-level stack to leave its fast path processing and determine the state change.

In a typical system as shown in FIG. 3, each application 1 has its own user-level TCP stack 5 by which it can communicate with its hardware 6. This enables shorter processing times because the application need not share the stack with other applications. As stated above, the stack 5 is in the same address space as its corresponding application. Additionally, each stack 5 is associated with a dedicated driver (not shown) in the kernel 4 of the operating system. In this arrangement, when the application 1 attempts to open a descriptor that is being used by the stack 5, for example a descriptor for accessing the TCP driver in the kernel 4, the operating system 3 cannot identify that there is a conflict because the stack 5 and the application 1 are in the same address space. The conflict arises due to the fact that in order for the L5 stack to operate it requires operating system descriptors, and these descriptors must be allocated from the same address space as the descriptors used by the application. However, the application has no a priori knowledge of the existence of the L5 stack.

A detailed example of file descriptor ownership will now be given in the context of the invention. A file descriptor identifying a port of a network interface is allocated to a process of an application. The application is communicating with a data processing device remote from the system on which the application is running. The process therefore requires access to the relevant network interface port to enable communication of data between the host system and the remote device. The ownership of the file descriptor by the process permits such access. In this example, when the process wishes to transmit data to the remote device, it issues an appropriate syscall towards the OS. The interfacing library determines from its descriptor table 40 (illustrated here by a designation of "L5") that the transmit operation identified in the syscall is to be processed by the user-level stack 5. Thus, in the terminology of the present application, it may be said that the stack 5 owns the file descriptor identifying the network interface port, or that the file descriptor is allocated to the stack 5. In other words, the stack is to perform the processing (in this case, network protocol processing) of an instruction sent by the process and indicating the file descriptor. It may also be said that the file descriptor is owned by, or allocated to, the process sending the transmit instruction.

A specific example in accordance with the present invention will now be described. The operating system 3 allocates descriptor number 42 for use by the L5 TCP stack 5. The application 1 then sends a Dub2(X,42) call, requesting that descriptor 42 becomes a copy of descriptor X. If this instruction were executed by the operating system it would cause a conflict because descriptor 42 is already in use to identify the stack. Normally such a conflict would be avoided by the operating system preventing one process from having access to a descriptor that is already in use by another process. However, in this case the application and the user-level stack 5 occupy the same address space as far as the operating system is concerned, and so the operating system could not normally allow this Dup2( ) call to proceed, unless the application were to first close the existing resource having descriptor 42. To avoid such a conflict, the socket library 2 intercepts Dup2( ) calls and identifies whether they request a descriptor assigned to the stack to be redefined. The socket library checks in the table 40, which additionally includes a flag indicating whether each descriptor is a private L5 user-level stack descriptor, and if it determines that there will be a clash, a series of operations is carried out by the socket library.

Thus, the socket library intercepts the syscall Dup2(X,42) from the application 1, which is an attempt to transform descriptor 42 into a duplicate of the descriptor X. The socket library checks the table 40 for a flag indicating that 42 is private to the L5 stack. It determines that it is, and blocks the application's thread, as would happen for any syscall. The library obtains a lock on descriptor 42 to prevent other actions being carried out in relation to it. The library then sends a Dup2(42,Y) call to the operating system, requesting that the current definition of descriptor 42 is duplicated at some unused descriptor Y, so that the stack can subsequently operate with descriptor Y.

If the Dup2(42,Y) call fails, for example due to an internal error within the stack 5, the socket library forges a message to the application 1 to indicate that the Dup2(X,42) call from the application failed. On the other hand, if the Dup2(42,Y) call succeeds, the application's thread is released, and the Dup2 (X,42) call can be forwarded by the socket library to the operating system, resulting in the duplication of descriptor X in descriptor 42. When the socket library receives a response from the operating system indicating that the Dup2(42,Y) call was successful, it forwards a response to the application, which the application interprets as being confirmation that its Dup2(X,42) call succeeded. The application can then use descriptor 42 and the stack can use the new descriptor Y, and the potential conflict is thus prevented.

The sequence of operations described above can involve a high processing overhead, so to inhibit an application from requesting the use of a descriptor that is in use by the stack, it is preferred that such a descriptor is marked by the operating system as reserved. The operating system would then be unlikely to inform an application that such a descriptor is available and so it is unlikely that the application will request the use of such a descriptor.

The dup2( ) instruction is an example of an instruction to duplicate a descriptor that is used in the Unix and Linux operating systems. Other operating systems may be responsive to other instructions to perform functionally equivalent duplication of descriptors, and similar techniques can be applied to avoid conflicts in those operating systems too.

The present invention has been described with reference to an implementation for transmitting and receiving data over a network. However, it is applicable in other situations such as, more generally, where a resource that is identified by a descriptor and is configured without the direct knowledge of an application shares an address space (or other means by which it can be identified by the operating system for the purpose of preventing clashes on execution of duplication instructions) with that application. Examples of such situations could involve the provision of a user-level resource for interfacing with a storage device or for buffering data to an on-board co-processor.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A data processing system comprising:
    an operating system for supporting processes, the operating system being arranged to output data by addressing the data to a descriptor corresponding to an intended destination of the data;
    an interface for interfacing between each process and the operating system;
    a memory including one or more address spaces, there being an address space corresponding to each of the processes for use by the respective process; and
    a data communication stack for one of the processes, the stack being located in the address space corresponding to the respective process and having a descriptor allocated to it;
    the interface being arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed by duplicating the descriptor;
    wherein a failure to duplicate the descriptor by means of a system call executed to duplicate the descriptor is reported to the said respective process as a failure of the said request.

2. A data processing system according to claim 1, wherein the said request is a Dup2( ) system call.

3. A data processing system according to claim 1, wherein the changing of the descriptor allocated to the stack is carried out by means of a Dup2( ) system call.

4. A data processing system according to claim 1, wherein each process is associated with a corresponding stack.

5. A data processing system according to claim 1, wherein the descriptor allocated to the stack is flagged by the operating system as being allocated to a stack.

6. A data processing system according to claim 1, wherein the stack is implemented at user-level.

7. A data processing system according to claim 1, wherein the interface is a library.

8. A data processing system according to claim 1, wherein the interface is an application program interface.

9. An interface for a data processing system comprising:

an operating system for supporting processes, the operating system being arranged to output data by addressing the data to a descriptor corresponding to an intended destination of the data and;

a memory including one or more address spaces, there being an address space corresponding to each of the processes for use by the respective process, and a data communication stack for one of the processes, the stack being located in the address space corresponding to the respective process and having a descriptor allocated to it;

the interface being for interfacing between each process and the operating system and being arranged to analyze requests to alter the allocation of a descriptor sent by the processes towards the operating system to identify whether such a request relates to altering the allocation of the descriptor allocated to the stack, and if it does, allocate a different descriptor to the stack and subsequently permit the request to be processed by duplicating the descriptor;

wherein a failure to duplicate the descriptor by means of a system call executed to duplicate the descriptor is reported to the said respective process as a failure of the said request.

10. A memory storing program data defining an interface as claimed in claim 9.

11. A method for processing requests sent by processes in a data processing system comprising:

providing:

an operating system for supporting processes, the operating system being arranged to output data by addressing the data to a descriptor corresponding to an intended destination of the data;

an interface for interfacing between each process and the operating system;

a memory including one or more address spaces, there being an address space corresponding to each of the processes for use by the respective process; and a data communication stack for one of the processes, the stack being located in the address space corresponding to the respective process and having a descriptor allocated to it;

the method comprising the steps of:

analyzing requests to alter the allocation of a descriptor sent by the processes towards the operating system to identify whether such a request relates to altering the allocation of the descriptor allocated to the stack; and if it does, allocating a different descriptor to the stack and subsequently permitting the request to be processed by duplicating the descriptor;

wherein a failure to duplicate the descriptor by means of a system call executed to duplicate the descriptor is reported to the said respective process as a failure of the said request.

12. A memory storing program data of claim 11, defining an interface.

13. A method for processing requests sent by processes in a data processing system as described in claimed 11.

\* \* \* \* \*